3,340,323
PROCESS FOR THE PRODUCTION OF
4-METHYLPENTENE-1
Helmut Mägerlein, Erlenbach, Erhard Siggel, Seckmauern, and Gerhard Meyer, Obernburg, Germany, assignors to Vereinigte Glanzstoff-Fabriken AG, Wuppertal-Elberfeld, Germany
No Drawing. Filed Mar. 16, 1966, Ser. No. 534,677
Claims priority, application Germany, Mar. 26, 1965, V 28,142
6 Claims. (Cl. 260—683.15)

This invention is directed to an improvement in the production of 4-methylpentene-1 by the catalytic dimerization of propylene. More particularly, the improvement of the invention is concerned with the use of a solid metallic lithium catalyst prepared in a particular manner and the use of this catalyst in the dimerization of propylene in order to give a higher selective yield of 4-methylpentene-1.

It has been known for some time that gaseous propylene can be converted into higher molecular weight hydrocarbons at temperatures between 40° C. and 200° C. at elevated pressures and in the presence of an alkali metal or alkali metal mixtures as the catalyst. Depending upon the temperature, the alkali metal may be present either in the molten or in the solid state. When working according to these well-known procedures, it has not previously been possible to increase the yield with respect to 4-methylpentene-1 to values above 80% by weight, and the yields usually fall much lower than this value. The best results have been achieved in conventional methods by using potassium as the catalyst, the other alkali metals giving only very small amounts of the desired dimerization products. When supporting the alkali metal on a carrier such as carbon as disclosed in U.S. Patent No. 2,881,234, one does not achieve any appreciable amount of 4-methylpentene-1 in the dimerization product. The use of other carriers such as alumina has likewise been considered to give negligible yields of 4-methylpentene-1 in the $C_6$ fraction of the dimerized product.

The use of a finely dispersed solid metallic lithium catalyst has been disclosed in our copending application with Wolfgang Rosener, Ser. No. 296,379, filed July 19, 1963, now U.S. Patent 3,278,634, whereby it is possible to achieve higher conversion rates of propylene with a high selectivity for the desired 4-methylpentene-1 product. The metallic lithium catalyst used in this dimerization of propylene is produced by remetallization with another alkali metal of an organic lithium compound of the formula Li—R, wherein R stands for an alkyl group of 2 to 18 carbon atoms, an aryl or a cycloalkyl group. The dimerization reaction is carried out at temperatures which maintain the lithium in the solid state, for example from about 100° C. up to about 180° C., preferably 160–180° C. A wide range of pressures are suitable, e.g. from 1 to 250 atmospheres, preferably from 50 to 250 atmospheres. In other respects, the dimerization reaction is carried out in a conventional manner by introducing the propylene into an inert liquid hydrocarbon solvent or diluent containing the catalyst. By comparison to the more conventional processes described in the preceding paragraph, the process using metallic lithium as described in copending application Ser. No. 296,379, provides a substantially increased selectivity such that 4-methylpentene-1 is obtained in yields between 85 and 90% by weight with reference to the total hexene product. Nevertheless, it is still desirable to increase the selectivity so as to obtain even higher yields of 4-methylpentene-1.

One object of the present invention is to provide a still further improvement in the process for the production of 4-methylpentene-1 by catalytic dimerization of propylene with a solid metallic lithium catalyst. More particularly, it is the object of the present invention to improve the conversion rate of propylene into dimerization products without any loss in the selectivity of the reaction for the production of 4-methylpentene-1. These and other objects and advantages of the invention will be more readily understood from the following detailed description.

In accordance with the present invention, it has now been found that the conversion of the propylene can be increased about 50 to 100% by comparison with the process described in copending application Ser. No. 296,379, if the propylene is reacted while in contact with a lithium catalyst which has been produced by remetallization of the organic lithium compound with another alkali metal deposited or precipitated on finely divided carbon as a carrier. Other than the specific method by which the metallic lithium catalyst is prepared, the process of the present invention is carried out in substantially the same manner as that disclosed in the above noted copending application. The fact that a further improvement in the process could be achieved by using carbon as a carrier substance for the remetallized lithium was quite surprising, because the prior use of such carrier substances with various alkali metal catalysts has shown a much inferior selectivity for the production of 4-methylpentene-1 in comparison with the alkali metal catalysts used without a carrier substance.

The process according to the invention can be carried out by using as the catalyst the complete mixture formed by the remetallization of the organic lithium compound with another alkali metal deposited on the finely divided carbon carrier. In other words, it is not necessary to separate the mixture of reaction products obtained in the preparation of the catalyst. On the other hand, it is also possible to separate the remetallized lithium together with the carbon carrier from the remaining substances formed during preparation of the catalyst, such that only the metallic lithium now deposited on the carrier is introduced into the dimerization reaction as the catalyst.

The dimerization of the propylene is carried out in the inert liquid hydrocarbon, which is thoroughly dried for removal of water as is customary, while maintaining the reaction temperature preferably within the range of 160–180° C., most favorably at a temperature just below the melting point of the lithium, i.e. at about 180° C. It is preferable to use those inert hydrocarbons whose boiling point lies above the temperature chosen for the dimerization reaction, e.g. gasoline or petroleum distillate fractions with boiling point ranges of about 180° C. to 220° C. The use of such higher-boiling inert hydrocarbons is desirable because the dimerization products can be more easily separated from the reaction mixture when there is a greater difference between the boiling temperature of the solvent on the one hand and that of the dimerization products on the other hand. Although it is also possible to use inert hydrocarbons with a lower boiling point, such as benzene or heptane, this procedure is less desirable because the yield per unit time is comparatively lower as the result of working with lower concentrations of propylene in the reaction vessel. The process of the invention is suitably carried out at any pressure from normal pressure up to highly elevated pressures.

The organic lithium compound used in the preparation of the catalyst for the present invention can be selected from any of the compounds of the formula Li—R in which R is a hydrocarbon radical of at least 2 carbon atoms up to about 18 carbon atoms. Those compounds are preferred wherein R is an alkyl radical of 2 to 18 carbon atoms, preferably lower alkyl of about 2 to 6 carbon atoms, i.e. ethyl, propyl, butyl, pentyl and hexyl radicals.

The finely divided carbon employed as the carrier for the lithium catalyst in accordance with the invention can be obtained from various sources. Various types of carbon black are especially suitable for purposes of the invention, e.g. acetylene black, lamp black, flame black or gas black. The methods of producing these various types of carbon black are well known and do not require a detailed explanation. It is particularly advantageous to employ carbon black with an average particle size between about 100 and 2000 A. Other carbon carriers are somewhat less desirable, but it is also possible to use finely pulverized graphite or a finely ground active carbon such as charcoal.

The carbon supported metallic lithium catalyst to be used for the dimerization reaction according to the invention is prepared in the following manner. First, it is desirable to thoroughly heat the finely divided carbon carrier under a vacuum, in order to free the reaction medium from foreign gases and water. Then, an alkali metal such as potassium is melted in the carbon dispersion and is precipitated or deposited on the finely divided carbon by means of a short intensive mixing or stirring of the mixture. Of course, it is also possible to add the catalytic materials in another order, e.g. by first melting the alkali metal and dispersing it by intensive mixing and subsequently adding the finely divided carbon so that the alkali metal will be deposited thereon. In addition, it is possible to use mixtures of various alkali metals other than lithium. After cooling the reaction medium to room temperature, the initial alkali metal is substantially completely carried on the finely divided carbon, and it is then possible to add the lithium organic compound for the purpose of remetallization. Also, it is desirable to finely distribute the organic lithium compound before its addition into the inert hydrocarbon containing the initial carbon supported alkali metal. The remetallization then proceeds according to the equation

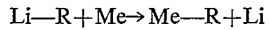

wherein Me represents the other alkali metal initially deposited on the carbon carrier. Special temperatures are not required for the remetallization since it takes place in a satisfactory manner at about room temperature. It is especially desirable, however, to avoid higher temperatures at which either the lithium or the other alkali metal compound would melt. Once the lithium has replaced the other alkali metal on the finely divided carbon carrier, the resulting catalyst can be separated from the remetallization reaction medium or else the entire mixture can be used directly in the dimerization process.

The finely divided and highly active state of the solid lithium supported on the carbon carrier should be preserved by carrying out the dimerization of the propylene under reaction conditions which do not exceed the melting point of the lithium. On the other hand, it is possible to carry out the dimerization reaction using the catalyst of the invention at temperatures above the melting point of other alkali metals. Thus, it is particularly advantageous to use temperatures for the reaction of the propylene of 160–180° C., and especially about 180° C.

Outstanding results can be achieved with the process of the invention if it is carried out in a continuous manner by leading propylene into the catalyst dispersion present in the reaction vessel and continuously drawing off part of the reaction mixture after first achieving a conversion of about 25% by weight of the propylene. The dimerization product and unreacted propylene are readily separated from the continuously withdrawn mixture. From the mixture of dimerization products, the 4-methylpentene-1 which boils at 53.9° C. is easily separated by distillation from the remaining higher-boiling hexene isomers which are present in relatively small amounts as by-products. The catalyst suspension in the inert hydrocarbon as well as the unreacted propylene can then be recycled to the reaction vessel.

Working in a continuous manner with the process of the invention is especially desirable, because not only is the conversion rate of the propylene considerably improved but also it is possible to achieve an extremely high selectivity for the 4-methylpentene-1, e.g. such that the dimerization product contains 95% by weight of 4-methylpentene-1.

The desired product, 4-methylpentene-1, is used primarily for the production of polymers, especially the pure poly-4-methylpentene-1. It has been found that when using the dimerization product of the continuous process according to the invention, the slight amounts of 4-methylpentene-2 and mixtures of other hexene isomers accumulating in the process of the invention neither hinder nor enter into the polymer chain in any perceptible amounts. Accordingly, the dimerization product resulting from the process of the invention can be used directly for polymerization without further separation or purification of the product. This constitutes a particularly desirable advantage for the process according to the present invention.

The preparation of the catalyst and the dimerization process of the invention are specifically illustrated by the following examples, it being understood that the invention is not to be limited to these examples.

EXAMPLE 1

20 grams of gas black, i.e. carbon black obtained by the incomplete combustion of natural gas, having an average particle size of 120 A. were suspended under a nitrogen atmosphere in 1 liter of a high-boiling diesel oil (B.P.=180–220° C.) contained in a 4-liter round-bottomed flask. Then, 20.2 grams of potassium in the form of solid metal particles were introduced into the flask and the contents heated up to 150° C. After reaching this temperature, the contents of the flask were intensively mixed by a mechanical agitator for 3 to 4 minutes and then cooled to room temperature. A solution of 18.5 grams of lithium-ethyl in 1 liter of the same diesel oil were then added dropwise into the flask while stirring the contents. After completing this addition of the lithium-ethyl, the contents of the flask were further agitated for another 5 hours at room temperature in order to complete the remetallization reaction.

The catalyst mixture produced in this manner was placed directly into a 20 liter steel alloy autoclave equipped with a lift agitator. Another 2 liters of the same diesel oil, which had first been thoroughly dried in the customary manner, and also 4 kilograms of propylene were then introduced and the autoclave heated to 180° C. The pressure in the autoclave dropped over a 10 hour period from an initial pressure of 140 atmospheres down to 70 atmospheres. Upon completion of the reaction at this point, the autoclave was cooled and the unreacted propylene separated by flash evaporation. The catalyst was decomposed by the addition of 200 ml. of ethanol and the autoclave was then emptied. 1320 grams of dimerization product were recovered from the reaction mixture by distillation, and this product consisted of 86.7% by weight of 4-methylpentene-1.

EXAMPLE 2

10 grams of flame black, i.e. carbon black produced by incomplete combustion in a gas flame, having an average particle size of 600 A. were suspended in diesel oil as in Example 1, the suspension being contained in a 4-liter flask under nitrogen. 20.2 grams of potassium were then added in the form of solid metal particles and the flask was heated to 120° C. The contents of the flask were then intensively agitated for 2 minutes and cooled to a temperature of 40° C. Thereafter, a solution of 33.1 grams of lithium-butyl in 1 liter of the same diesel oil were introduced dropwise into the flask, and agitation was continued for a further period of 3 hours.

The catalyst obtained in this manner was poured directly into a 10-liter steel alloy autoclave equipped with a horizontally rotating wing agitator, and 2.5 kg. of propylene were added. The autoclave was heated to 180° C., at which point the the pressure amount to 150 atmospheres, and during the next 10 hours of the reaction the pressure dropped to 65 atmospheres. At this point, the dimerization reaction was completed and the reaction product was worked up in the same manner as described in Example 1. There were obtained 1370 grams of a dimerization product which consisted of 85% by weight of 4-methylpentene-1.

EXAMPLE 3

17 grams of acetylene carbon black with an average particle size of 2000 A. were suspended in 1 liter of a high-boiling diesel oil as in Example 1, and 14.5 grams of metallic sodium were then added and the contents of the flask heated to a temperature of 160° C. After 4 minutes of thorough mixing, the flask was cooled to 30° C. and 45.4 grams of lithium-phenyl dispersed in 1 liter of the diesel oil were added to the flask. The dimerization of propylene was then carried out in the same manner and under the same conditions as described in Example 2. The working up of the dimerization product yielded 1120 grams of product with a content of 85.3% by weight of 4-methylpentene-1.

EXAMPLE 4

A metallic lithium catalyst supported on carbon black was produced in the same manner as described in the first paragraph under Example 2. The lithium catalyst was poured together with 4 liters of the diesel oil into a continuously operated unit consisting of a 10-liter autoclave equipped with a mixer. The autoclave was heated to a temperature of 160° C. and propylene was introduced up to a pressure of 50 atmospheres. After a reaction time of 1 hour, half of the contents of the autoclave were released, cooled to 100° C. and evaporated in a degassing cell over a suitable flash evaporation apparatus and cooler. Meanwhile, the propylene pressure in the autoclave was raised to 100 atmospheres and maintained at this pressure during the entire course of the reaction by the continuous addition of propylene. Then, during the course of the continuous reaction, about 1 liter per hour of the reaction mixture containing the catalyst was continuously released from the autoclave into a degassing cell. In this cell, propylene and the hexenes formed by the reaction were separated from the catalyst suspension. The catalyst suspension was continuously conveyed by means of a pump back into the autoclave, the feed of this recycle was so adjusted that at all times one-half of the catalyst suspension was in the autoclave and the other half in circulation. The propylene and isomeric hexenes separated off in the degassing cell were brought to room temperature in a cooler and led into a distillation column. The recovered gaseous propylene was recompressed in a compressor and then pumped back into the autoclave. A gasometer was inserted in the propylene feed line to improve the dosing of the propylene into the reaction zone of the autoclave. The remaining fluid hexenes were separated into their individual isomers with a continuously operated distillation unit. The total hexene yield amounted to 45 grams per hour with a 4-methylpentene-1 content of 94 to 95% by weight. In addition, it was possible to further obtain 3 to 4% by weight of 4-methylpentene-2 with reference to the total hexene yield.

It will be noted from the preceding examples that the process of the invention is a substantial improvement in the conversion of propylene into hexenes while maintaining a very high selectivity for the desired 4-methylpentene-1 product. Consistently good results have been been achieved in this manner provided that the lithium catalyst is prepared in the manner described herein, i.e. by remetallization of lithium from an organic lithium compound with another alkali metal which has first been deposited on a carbon black carrier. In this respect, the remetallization reaction should be carried out at a temperature below the melting point of both the lithium and the other alkali metal initially contained on the carbon black carrier. Particularly good results are achieved, according to the invention, when the process is carried out in a continuous manner so that the process of the invention is especially adapted for the commercial production 4-methylpentene-1.

The invention is hereby claimed as follows:

1. In a method for the production of 4-methylpentene-1 wherein propylene is dimerized at a temperature of about 100° C. to 180° C. and a pressure of about 1 to 250 atmospheres in an inert hydrocarbon diluent and in contact with a finely dispersed solid metallic lithium as a catalyst obtained by remetallization of an organic lithium compound of the formula Li—R, wherein R represents a radical selected from the group consisting of alkyl of 2 to 18 carbon atoms, cycloalkyl and aryl, with another alkali metal, the improvement which comprises: carrying out the dimerization reaction by contacting the propylene with said lithium catalyst obtained by remetallization of said organic lithium compound with said other alkali metal precipitated onto finely divided carbon as a carrier.

2. A method as claimed in claim 1 wherein the reaction temperature is about 160° C. to 180° C.

3. A method as claimed in claim 1 wherein said carrier is finely divided carbon black having an average particle size between about 100 and 2000 A.

4. A method as claimed in claim 1 wherein said other alkali metal is potassium.

5. A method as claimed in claim 4 wherein said carrier is finely divided carbon black having an average particle size between about 100 and 2000 A.

6. A method as claimed in claim 1 wherein the dimerization reaction is carried out continuously.

References Cited

UNITED STATES PATENTS

| 2,881,234 | 4/1959 | Esmay et al. | 260—683.15 |
| 2,952,719 | 9/1960 | Appell | 260—683.15 X |
| 3,006,976 | 10/1961 | Shaw et al. | 260—683.15 X |
| 3,278,634 | 10/1966 | Magerlein et al. | 260—683.15 |

PAUL M. COUGHLAN, JR., *Primary Examiner.*